F. N. SPELLER.
PIPE COUPLING.
APPLICATION FILED JUNE 6, 1914.

1,141,151.

Patented June 1, 1915.

WITNESSES

INVENTOR

UNITED STATES PATENT OFFICE.

FRANK N. SPELLER, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

PIPE-COUPLING.

1,141,151.

Specification of Letters Patent. Patented June 1, 1915.

Application filed June 6, 1914. Serial No. 843,332.

*To all whom it may concern:*

Be it known that I, FRANK N. SPELLER, a citizen of the United States, residing at Pittsburgh, in the county of Allegheny and State of Pennsylvania, have invented certain new and useful Improvements in Pipe-Couplings, of which the following is a specification.

My invention relates to the manufacture of metal pipe couplings having internal screw threads and used in connecting the ends of metal pipes and similar tubular articles.

The object of my invention is to provide a metal pipe coupling having novel means whereby a tight joint is obtained and galling of the threads in applying the couplings to the screw threaded ends of the pipes is overcome and prevented.

The invention consists in coating the threads of the internally threaded couplings with zinc or a similar soft metal and preferably, with the metal coating on the threads increasing in thickness toward the ends from the middle of the length of the coupling.

Figure 2:
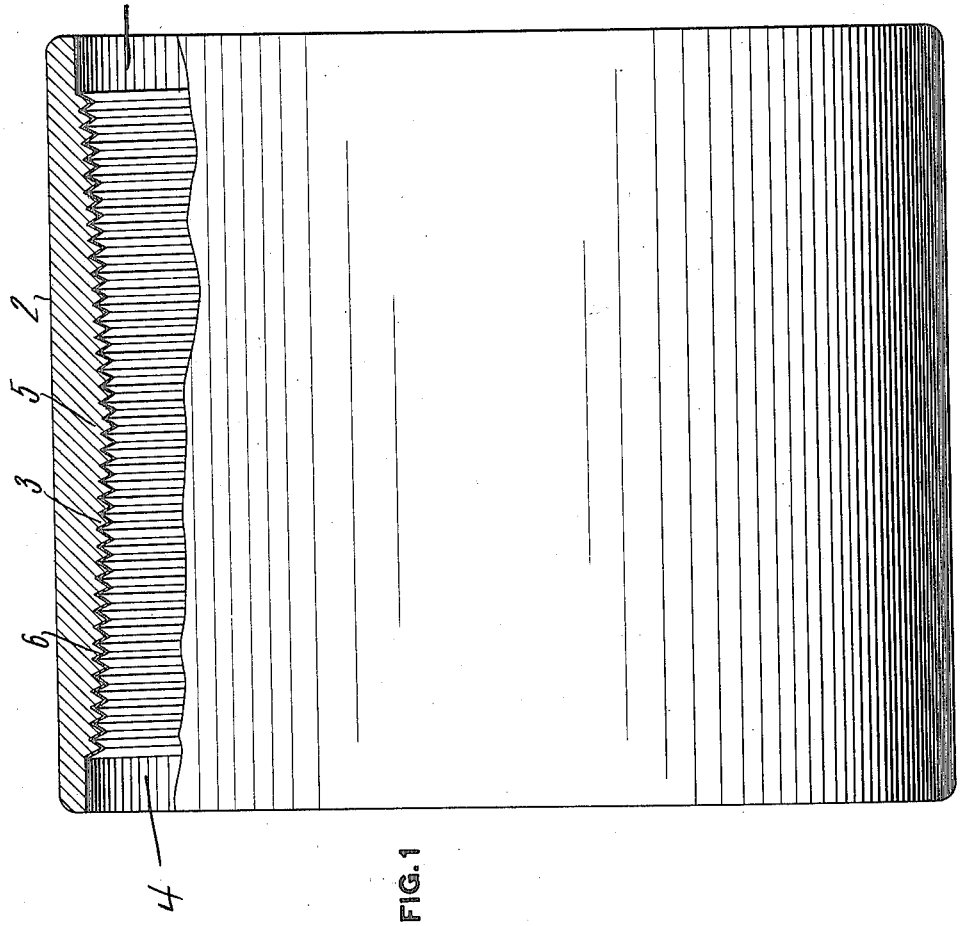
Figure 3:
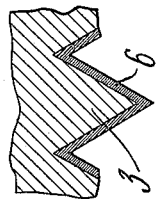
Figure 1:
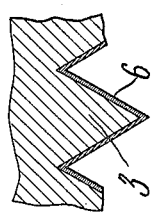

Referring to the accompanying drawings forming part of this specification, Figure 1 is a plan, partly in section, showing a pipe coupling with the threads thereof coated in accordance with my invention. Figs. 2 and 3 are detail sections on an enlarged scale showing the variations in thickness of the coating metal as applied preferably in carrying out my invention.

In the accompanying drawings the body 2 of the annulus forming the metal pipe coupling is provided with internal screw threads 3 which, as shown, taper outwardly toward the counterbored ends 4, 4, thereof from the middle 5 of the length of the coupling.

After the couplings 2 are tapped, the grease and oil are removed from the threads 3. The coupling threads 3 are then provided with a coating 6 of softer metal such as zinc, and the metal coating 6 is preferably made heaviest at the ends, as shown in Fig. 2 gradually decreasing in thickness toward the middle of the length of the coupling until of the relative thickness shown in Fig. 3.

The outer surface of the coupling 2 may be coated or not as desired. The coating metal 6 may be applied to the threads 3 by electro-deposition by sherardizing or by dipping in a molten bath of the coating metal or in any other preferred manner.

The advantages of my invention, which will be appreciated by those skilled in the art, arise from the tightness secured in the threaded joints when the couplings are screwed on the ends of the pipes and in the prevention and avoidance of galling of the threads in screwing the couplings on the pipes to which they are applied.

I claim:—

1. A pipe coupling formed of metal, having internal screw threads, and having a coating of softer metal on said threads, the coating metal increasing in thickness from the middle of its length toward the ends of the coupling.

2. A pipe coupling formed of rolled steel, having internal screw threads, and having a coating of spelter on said threads, the spelter coating increasing in thickness from the middle of the length toward the ends of the coupling.

In testimony whereof, I have hereunto set my hand.

FRANK N. SPELLER.

Witnesses:
 CHRIS. SPRING,
 G. P. McCLIFF.